US012081019B2

(12) United States Patent
Mitani et al.

(10) Patent No.: US 12,081,019 B2
(45) Date of Patent: Sep. 3, 2024

(54) POWER SUPPLY SYSTEM

(71) Applicant: HONDA MOTOR CO., LTD., Tokyo (JP)

(72) Inventors: Manabu Mitani, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/192,153

(22) Filed: Mar. 29, 2023

(65) Prior Publication Data

US 2023/0327432 A1   Oct. 12, 2023

(30) Foreign Application Priority Data

Mar. 31, 2022   (JP) ................. 2022-058574

(51) Int. Cl.
*H02J 1/08* (2006.01)
*H02J 1/10* (2006.01)

(52) U.S. Cl.
CPC ............... *H02J 1/086* (2020.01); *H02J 1/10* (2013.01)

(58) Field of Classification Search
CPC .................. H02J 1/086; H02J 1/10
See application file for complete search history.

(56) References Cited

U.S. PATENT DOCUMENTS

2011/0148423 A1* 6/2011 Richards ............... G01R 31/14
324/424

FOREIGN PATENT DOCUMENTS

JP   2005-348519 A   12/2005

* cited by examiner

*Primary Examiner* — Daniel Cavallari
(74) *Attorney, Agent, or Firm* — Rankin, Hill & Clark LLP

(57) ABSTRACT

An abnormality determining section disconnects both a positive wire and a negative wire between a load module and a second ground circuit, connects one of a positive wire or a negative wire between a main power source apparatus and the second ground circuit, and determines whether there is an abnormality in a second main power source circuit based on an amount of power supplied to the second ground circuit in a state where one of the positive wire or the negative wire of the second main power source circuit is connected to a reference potential by the second ground circuit.

3 Claims, 13 Drawing Sheets

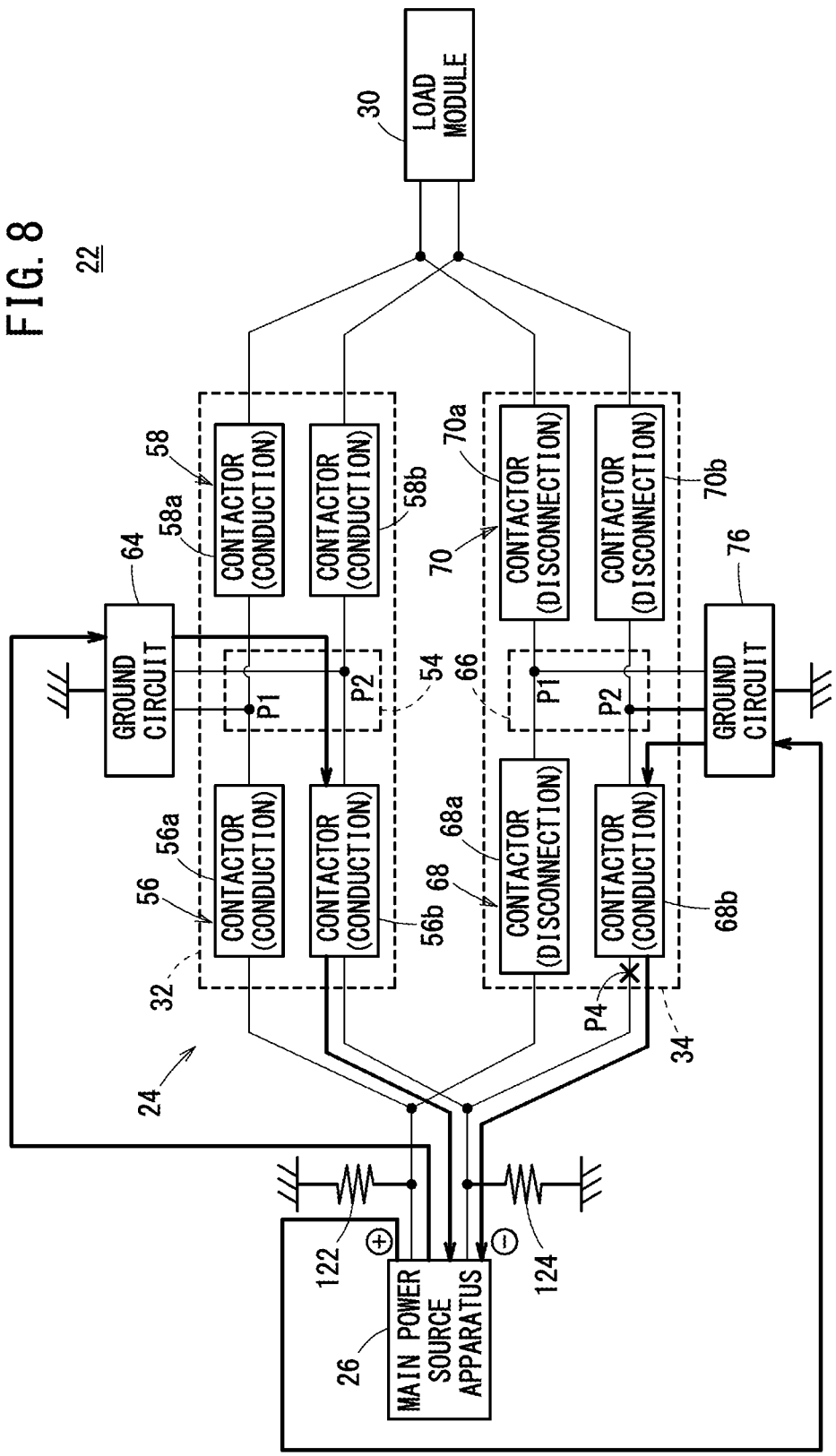

POWER SUPPLY SYSTEM

CROSS-REFERENCE TO RELATED APPLICATIONS

This application is based upon and claims the benefit of priority from Japanese Patent Application No. 2022-058574 filed on Mar. 31, 2022, the contents of which are incorporated herein by reference.

BACKGROUND OF THE INVENTION

Field of the Invention

The present invention relates to a power supply system.

Description of the Related Art

JP 2005-348519 A discloses a power feed system that includes a power source, which is normally used to feed power to a load, and an auxiliary power source, which feeds power to the load when the power source that is normally used has malfunctioned. With this power feed system, the auxiliary power source is connected to the load via a power source switching control apparatus that includes a voltage detector. In a state where power is being fed to the load from the power source that is normally used, this power feed system connects the voltage detector to one of the auxiliary power source or the load. With this power feed system, an abnormality in the power source switching control apparatus is determined according to the voltage detected by the voltage detector when the voltage detectors is connected to the auxiliary power source and the voltage detected by the voltage detector when the voltage detector is connected to the load.

SUMMARY OF THE INVENTION

With the technology disclosed in JP 2005-348519 A described above, there is a problem that if a short occurs in the wire where the voltage detector is provided, a short-circuit current flows from the auxiliary power source to the location of the short when the voltage detector is connected to the auxiliary power source, and the auxiliary power source cannot be used. Furthermore, there is a problem that if a short occurs in the wire where the voltage detector is provided, a short-circuit current flows from the normally-used power source to the location of the short when the voltage detector is connected to the load, and the normally-used power source cannot be used.

The present invention has the object of solving the above problems.

A power supply system according to an aspect of the present invention comprises: a first main power source circuit configured to transmit direct current power from at least one main power source apparatus to at least one load apparatus; a second main power source circuit provided in parallel with the first main power source circuit, and configured to transmit direct current power from the at least one main power source apparatus to the at least one load apparatus; a ground circuit connected to the second main power source circuit, and configured to connect the second main power source circuit to a reference potential; and one or more processors that execute computer-executable instructions stored in a memory. The one or more processors execute the computer-executable instructions to cause the power supply system to, in a case where power is being transmitted from the main power source apparatus to the load apparatus by the first main power source circuit and power is not being transmitted from the main power source apparatus to the load apparatus by the second main power source circuit: disconnect both a positive wire and a negative wire between the load apparatus and the ground circuit, connect one of a positive wire or a negative wire between the main power source apparatus and the ground circuit, and determine whether there is an abnormality in the second main power source circuit based on an amount of power supplied to the ground circuit in a state where one of a positive wire or a negative wire of the second main power source circuit is connected to the reference potential by the ground circuit; or disconnect both the positive wire and the negative wire between the main power source apparatus and the ground circuit, connect one of the positive wire or the negative wire between the load apparatus and the ground circuit, and determine whether there is an abnormality in the second main power source circuit based on the amount of power supplied to the ground circuit in the state where one of the positive wire or the negative wire of the second main power source circuit is connected to the reference potential by the ground circuit.

According to the present invention, even when the second main power source circuit is energized in a state where the second main power source circuit has shorted, the transmission of power from the main power source apparatus to the load apparatus can be maintained.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a schematic view of the power supply system;

DETAILED DESCRIPTION OF THE INVENTION

First Embodiment

[Configuration of Aircraft]

Figure 1:
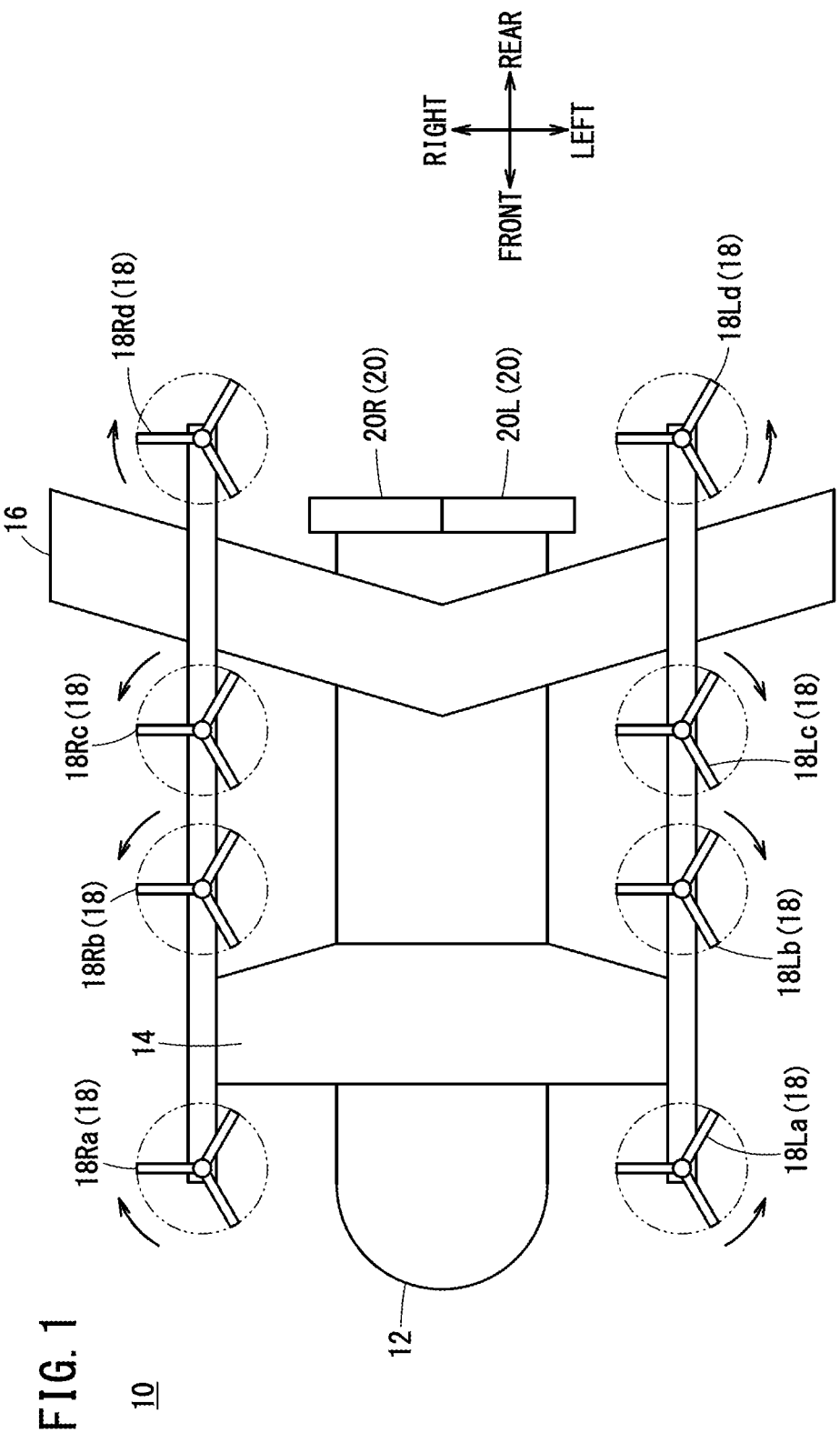
FIG. 1 is a schematic view of an aircraft.

FIG. 1 is a schematic view of an aircraft 10. The aircraft 10 of the present embodiment is an electric vertical take-off and landing aircraft (eVTOL aircraft). The aircraft 10 includes rotors that are driven by electric motors. The aircraft 10 generates thrust in a vertical direction and thrust in a horizontal direction with the rotors. Further, the aircraft 10 is a hybrid aircraft. The aircraft 10 includes a power generator and a battery, as power sources for the electric motor. In the aircraft 10, the power generated by the power generator is supplied to the electric motor. If the power generated by the power generator is insufficient for the required power, the power stored in the battery is supplied to the electric motor.

The aircraft 10 includes a fuselage 12. The fuselage 12 is provided with a cockpit, a cabin, and the like. A pilot rides in the cockpit, and steers the aircraft 10. Passengers or the like ride in the cabin. The aircraft 10 may be steered in an automated manner.

The aircraft 10 includes a front wing 14 and a rear wing 16. When the aircraft 10 moves forward, the front wing 14 and the rear wing 16 each generate lift.

The aircraft 10 includes eight VTOL rotors 18. The eight VTOL rotors 18 are a rotor 18La, a rotor 18Lb, a rotor 18Lc, a rotor 18Ld, a rotor 18Ra, a rotor 18Rb, a rotor 18Rc, and a rotor 18Rd.

The rotating shaft of each VTOL rotor 18 extends in an up-down direction of the fuselage 12. The thrust of each VTOL rotor 18 is controlled by adjusting the rotational speed of the rotor and the pitch angle of the blades. Each VTOL rotor 18 is used during vertical takeoff, transition from vertical takeoff to cruising, transition from cruising to vertical landing, vertical landing, hovering, and the like. Furthermore, each VTOL rotor 18 is used during attitude control.

By controlling the thrust of each VTOL rotor 18, lift thrust is generated. The lift thrust indicates thrust in a vertical direction. By controlling the thrust of each VTOL rotor 18, a roll moment, pitch moment, and yaw moment act on the fuselage 12.

The aircraft 10 includes two cruise rotors 20. The two cruise rotors 20 are a rotor 20L and a rotor 20R. The rotor 20L and the rotor 20R are attached to the rear portion of the fuselage 12.

The rotating shaft of each cruise rotor 20 extends in a front-rear direction of the fuselage 12. The thrust of each cruise rotor 20 is controlled by adjusting the rotational speed of the rotor and the pitch angle of the blades. Each cruise rotor 20 is used during transition from vertical takeoff to cruising, cruising, transition from cruising to vertical landing, and the like.

By controlling the thrust of each cruise rotor 20, cruise thrust is generated. The cruise thrust indicates thrust in a horizontal direction.

[Configuration of Power Supply System]

Figure 2:
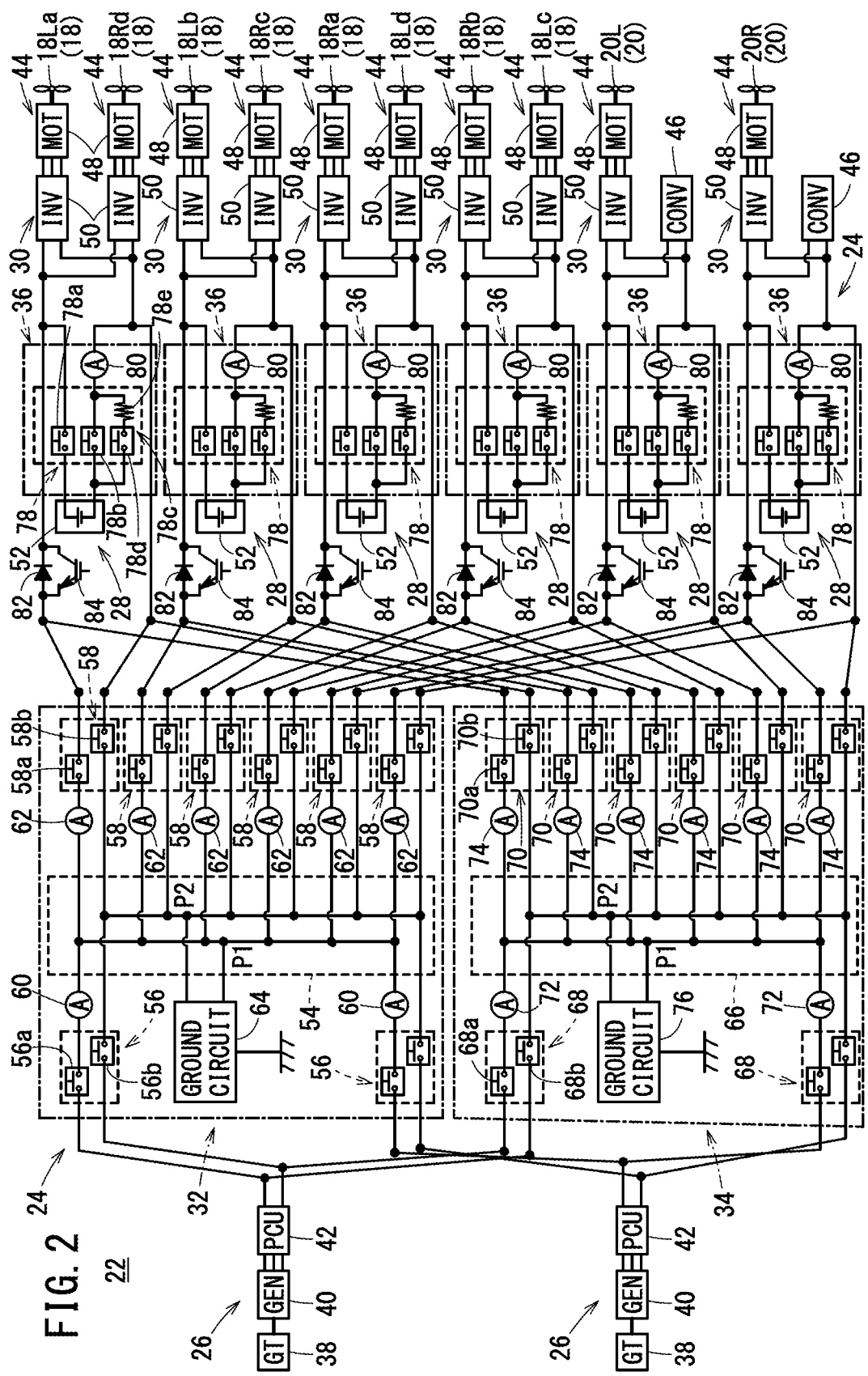
FIG. 2 is a schematic view showing a configuration of a power supply system.

FIG. 2 is a schematic view showing a configuration of a power supply system 22. The power supply system 22 includes a power supply circuit 24, two main power source apparatuses 26, and six auxiliary power source apparatuses 28.

The power supply circuit 24 supplies power to each of six load modules 30, from both of the two main power source apparatuses 26. The auxiliary power source apparatus 28 is provided for each load module 30. When the power supplied to the load module 30 from the main power source apparatus 26 is insufficient, power is supplied to this load module 30 from the auxiliary power source apparatus 28.

The power supply circuit 24 includes a first main power source circuit 32, a second main power source circuit 34, and six auxiliary power source circuits 36. The first main power source circuit 32 transmits DC power from the two main power source apparatuses 26 to all of the load modules 30. The second main power source circuit 34 transmits DC power from the two main power source apparatuses 26 to all of the load modules 30. The second main power source circuit 34 is provided in parallel with the first main power source circuit 32.

The auxiliary power source circuit 36 is provided for each auxiliary power source apparatus 28. Each auxiliary power source circuit 36 is connected to each auxiliary power source apparatus 28. Each auxiliary power source circuit 36 is connected to both the first main power source circuit 32 and the second main power source circuit 34. Each auxiliary power source circuit 36 transmits DC power from each auxiliary power source apparatus 28 to each load module 30. Each auxiliary power source circuit 36 transmits DC power from each auxiliary power source apparatus 28 to both the first main power source circuit 32 and the second main power source circuit 34.

Each main power source apparatus 26 includes a gas turbine 38, a power generator 40, and a power control unit (referred to below as a PCU) 42. The gas turbine 38 drives the power generator 40. Due to this, the power generator 40 generates power. The PCU 42 converts AC power generated by the power generator 40 into DC power, and outputs this DC power to the power supply circuit 24.

When the gas turbine 38 is started up, the PCU 42 converts the DC power supplied from the power supply circuit 24 into AC power, and outputs this AC power to the power generator 40. The power generator 40 operates using the power input from the PCU 42, and the power generator 40 drives the gas turbine 38.

Among the six load modules 30, four load modules 30 each include two drive units 44. The other two load modules 30 each include one drive unit 44 and one converter 46. The drive unit 44 drives each VTOL rotor 18 or each cruise rotor 20.

Each drive unit 44 includes an electric motor 48 and an inverter 50. The electric motor 48 is a three-phase motor. Each VTOL rotor 18 is connected to an output shaft of the corresponding electric motor 48. Each cruise rotor 20 is connected to the output shaft of the corresponding electric motor 48. The inverter 50 converts the DC power supplied from the power supply circuit 24 into three-phase AC power, and outputs this AC power to the electric motor 48.

The converter 46 steps down the voltage of the DC power supplied from the power supply circuit 24, and outputs this voltage to a device that operates using DC power. The device that operates using DC power is a cooling apparatus that cools the power supply circuit 24, the PCU 42, the inverter 50, and the like, for example. The device that operates using DC power is an ECU (Electronic Control Unit) that controls the power supply circuit 24, the gas turbine 38, the PCU 42, the inverter 50, and the like, for example.

Each auxiliary power source apparatus 28 includes a battery 52. The battery 52 is charged with power supplied from the main power source apparatus 26. Furthermore, the power charged in the battery 52 is supplied to the load module 30.

The first main power source circuit 32 includes a power transmission bus 54, two contactor units 56, six contactor units 58, two current sensors 60, and six current sensors 62.

The two main power source apparatuses 26 are connected to each other in parallel by the power transmission bus 54.

The six load modules 30 are connected to each other in parallel by the power transmission bus 54.

Each contactor unit 56 is provided between each main power source apparatus 26 and the power transmission bus 54. Each contactor unit 56 includes a contactor 56a and a contactor 56b. The contactor 56a is provided to a positive wire of the first main power source circuit 32. The contactor 56b is provided to a negative wire of the first main power source circuit 32.

The contactor 56a switches between a connection state, in which a positive wire of the power transmission bus 54 is connected to the main power source apparatus 26, and a disconnection state, in which the positive wire of the power transmission bus 54 is disconnected from the main power source apparatus 26. The contactor 56b switches between a state in which a negative wire of the power transmission bus 54 is connected to the main power source apparatus 26, and a state in which the negative wire of the power transmission bus 54 is disconnected from the main power source apparatus 26.

Each contactor unit 58 is provided between the power transmission bus 54 and each load module 30. Each contactor unit 58 includes a contactor 58a and a contactor 58b. The contactor 58a is provided to the positive wire of the first main power source circuit 32. The contactor 58b is provided to the negative wire of the first main power source circuit 32.

The contactor 58a switches between a state in which the positive wire of the power transmission bus 54 is connected to the load module 30, and a state in which the positive wire of the power transmission bus 54 is disconnected from the load module 30. The contactor 58b switches between a state in which the negative wire of the power transmission bus 54 is connected to the load module 30, and a state in which the negative wire of the power transmission bus 54 is disconnected from the load module 30.

Each current sensor 60 is provided between the power transmission bus 54 and each contactor unit 56. The current sensor 60 is provided to the positive wire of the first main power source circuit 32. Each current sensor 62 is provided between the power transmission bus 54 and each contactor unit 58. The current sensor 62 is provided to the positive wire of the first main power source circuit 32.

A first ground circuit 64 is connected to the power transmission bus 54. The first ground circuit 64 switches between a state in which one of the positive wire or the negative wire of the power transmission bus 54 is connected to a reference potential, and a state in which both the positive wire and the negative wire of the power transmission bus 54 are disconnected from the reference potential. Being connected to the reference potential specifically refers to being connected to the fuselage 12. The configuration of the first ground circuit 64 will be described in detail further below.

The second main power source circuit 34 includes a power transmission bus 66, two contactor units 68, six contactor units 70, two current sensors 72, and six current sensors 74.

The two main power source apparatuses 26 are connected to each other in parallel by the power transmission bus 66. The six load modules 30 are connected to each other in parallel by the power transmission bus 66.

Each contactor unit 68 is provided between the power transmission bus 66 and each main power source apparatus 26. Each contactor unit 68 includes a contactor 68a and a contactor 68b. The contactor 68a is provided to a positive wire of the second main power source circuit 34. The contactor 68b is provided to a negative wire of the second main power source circuit 34.

The contactor 68a switches between a connection state, in which a positive wire of the power transmission bus 66 is connected to the main power source apparatus 26, and a disconnection state, in which the positive wire of the power transmission bus 66 is disconnected from the main power source apparatus 26. The contactor 68b switches between a connection state, in which a negative wire of the power transmission bus 66 is connected to the main power source apparatus 26, and a disconnection state, in which the negative wire of the power transmission bus 66 is disconnected from the main power source apparatus 26.

Each contactor unit 70 is provided between the power transmission bus 66 and each load module 30. The contactor unit 70 includes a contactor 70a and a contactor 70b. The contactor 70a is provided to the positive wire of the second main power source circuit 34. The contactor 70b is provided to the negative wire of the second main power source circuit 34.

The contactor 70a switches between a state in which the positive wire of the power transmission bus 66 is connected to the load module 30, and a state in which the positive wire of the power transmission bus 66 is disconnected from the load module 30. The contactor 70b switches between a state in which the negative wire of the power transmission bus 66 is connected to the load module 30, and a state in which the negative wire of the power transmission bus 66 is disconnected from the load module 30.

Each current sensor 72 is provided between the power transmission bus 66 and each contactor unit 68. The current sensor 72 is provided to the positive wire of the second main power source circuit 34. Each current sensor 74 is provided between the power transmission bus 66 and each contactor unit 70. The current sensor 74 is provided to the positive wire of the second main power source circuit 34.

A second ground circuit 76 is connected to the power transmission bus 66. The second ground circuit 76 switches between a state in which one of the positive wire or the negative wire of the power transmission bus 66 is connected to the reference potential, and a state in which both the positive wire and the negative wire of the power transmission bus 66 are disconnected from the reference potential. The configuration of the second ground circuit 76 will be described in detail further below, along with the configuration of the first ground circuit 64.

Each auxiliary power source circuit 36 includes a contactor unit 78 and a current sensor 80. The contactor unit 78 includes a contactor 78a, a contactor 78b, and a precharge circuit 78c. The contactor 78a is provided to a positive wire of the auxiliary power source circuit 36. The contactor 78b is provided to a negative wire of the auxiliary power source circuit 36. The precharge circuit 78c is provided in parallel with the contactor 78b. The precharge circuit 78c includes a contactor 78d and a resistor 78e. The current sensor 80 is provided to the negative wire of the auxiliary power source circuit 36.

The contactor 78a switches between a state in which a positive electrode of the auxiliary power source apparatus 28 is connected to the first main power source circuit 32, the second main power source circuit 34, and each load module 30, and a state in which the positive electrode of the auxiliary power source apparatus 28 is disconnected from the first main power source circuit 32, the second main power source circuit 34, and each load module 30. The contactor 78b switches between a state in which a negative electrode of the auxiliary power source apparatus 28 is connected to the first main power source circuit 32, the second main power source circuit 34, and each load module 30, and a state in which the negative electrode of the auxiliary power source apparatus 28 is disconnected from the first main power source circuit 32, the second main power source circuit 34, and each load module 30. The contactor 78d switches between a state in which the negative electrode of the auxiliary power source apparatus 28 is connected to the resistor 78e, and a state in which the negative electrode of the auxiliary power source apparatus 28 is disconnected from the resistor 78e.

A diode 82 is provided between the first main power source circuit 32 and each auxiliary power source circuit 36. It can also be said that the diode 82 is provided between the second main power source circuit 34 and each auxiliary power source circuit 36. Each diode 82 has its anode connected to the first main power source circuit 32 and the second main power source circuit 34, and its cathode connected to the auxiliary power source circuit 36. Each diode 82 allows the supply of power from the first main power source circuit 32 and the second main power source circuit 34 to each auxiliary power source circuit 36. Each diode 82 blocks the supply of power from each auxiliary power source circuit 36 to the first main power source circuit 32 and the second main power source circuit 34.

Due to this, power is supplied from the main power source apparatus 26 to each auxiliary power source apparatus 28 via each diode 82. As a result, the battery 52 of each auxiliary power source apparatus 28 is charged. Furthermore, when a short has occurred in the first main power source circuit 32 or the second main power source circuit 34, the power of each auxiliary power source apparatus 28 is prevented from flowing to the first main power source circuit 32 or the second main power source circuit 34. As a result, even when a short has occurred in the first main power source circuit 32 or the second main power source circuit 34, power can be supplied from each auxiliary power source apparatus 28 to the drive unit 44 and the converter 46 in each load module 30.

A transistor 84 is provided in parallel with each diode 82. When the transistor 84 is ON, power is supplied from each auxiliary power source apparatus 28 to the first main power source circuit 32 and the second main power source circuit 34 while bypassing the diode 82.

[Configuration of Ground Circuits]

Figure 3:
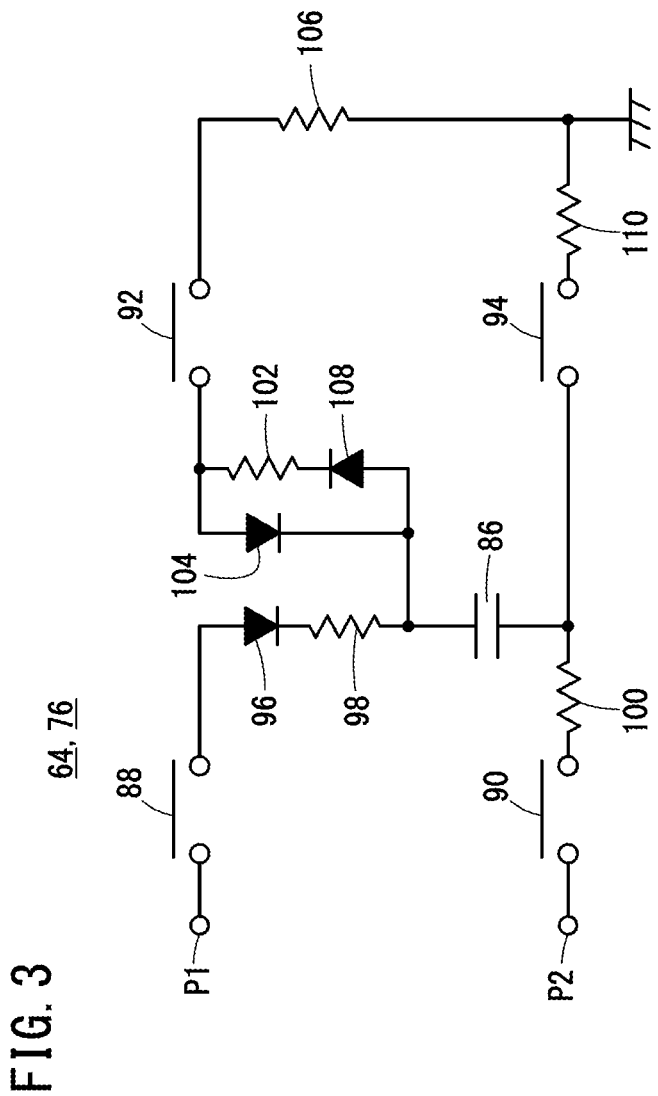
FIG. 3 is a circuit diagram of a first ground circuit and a second ground circuit.

FIG. 3 is a circuit diagram of the first ground circuit 64 and the second ground circuit 76. The first ground circuit 64 and the second ground circuit 76 have the same configuration.

The first ground circuit 64 and the second ground circuit 76 each include a capacitor 86 that operates as a flying capacitor. The first ground circuit 64 and the second ground circuit 76 each include a switching element 88, a switching element 90, a switching element 92, and a switching element 94. The switching element 88, the switching element 90, the switching element 92, and the switching element 94 switch the path of the current flowing through the first ground circuit 64 and the second ground circuit 76.

The switching element 88, the switching element 90, the switching element 92, and the switching element 94 are each formed by an insulated switching element, such as an optical MOSFET (Metal Oxide Semiconductor Field Effect Transistor).

One end of the switching element 88 is connected to a point P1 (FIG. 2) on the positive wire of the power transmission bus 54, or to a point P1 (FIG. 2) on the positive wire of the power transmission bus 66. The other end of the switching element 88 is connected to the anode of a diode 96. The cathode of the diode 96 is connected to one end of a resistor 98. The other end of the resistor 98 is connected to a positive-electrode-side terminal of the capacitor 86. The resistance value of the resistor 98 is relatively high, and has a magnitude of several kiloohms to several megaohms.

One end of the switching element 90 is connected to a point P2 (FIG. 2) on the negative wire of the power transmission bus 54, or to a point P2 (FIG. 2) on the negative wire of the power transmission bus 66. The other end of the switching element 90 is connected to one end of a resistor 100. The other end of the resistor 100 is connected to a negative-electrode-side terminal of the capacitor 86. The resistance value of the resistor 100 is relatively high, and has a magnitude of several kiloohms to several megaohms.

One end of the switching element 92 is connected to one end of a resistor 102 and to the anode of a diode 104. The other end of the switching element 92 is connected to one end of a resistor 106. The cathode of the diode 104 is connected to the positive-electrode-side terminal of the capacitor 86. The other end of the resistor 102 is connected to the cathode of a diode 108. The anode of the diode 108 is connected to the positive-electrode-side terminal of the capacitor 86. The other end of the resistor 106 is connected to the reference potential.

One end of the switching element 94 is connected to the negative-electrode-side terminal of the capacitor 86. The other end of the switching element 94 is connected to one end of a resistor 110. The other end of the resistor 110 is connected to the reference potential.

[Configuration of Control Apparatus]

Figure 4:
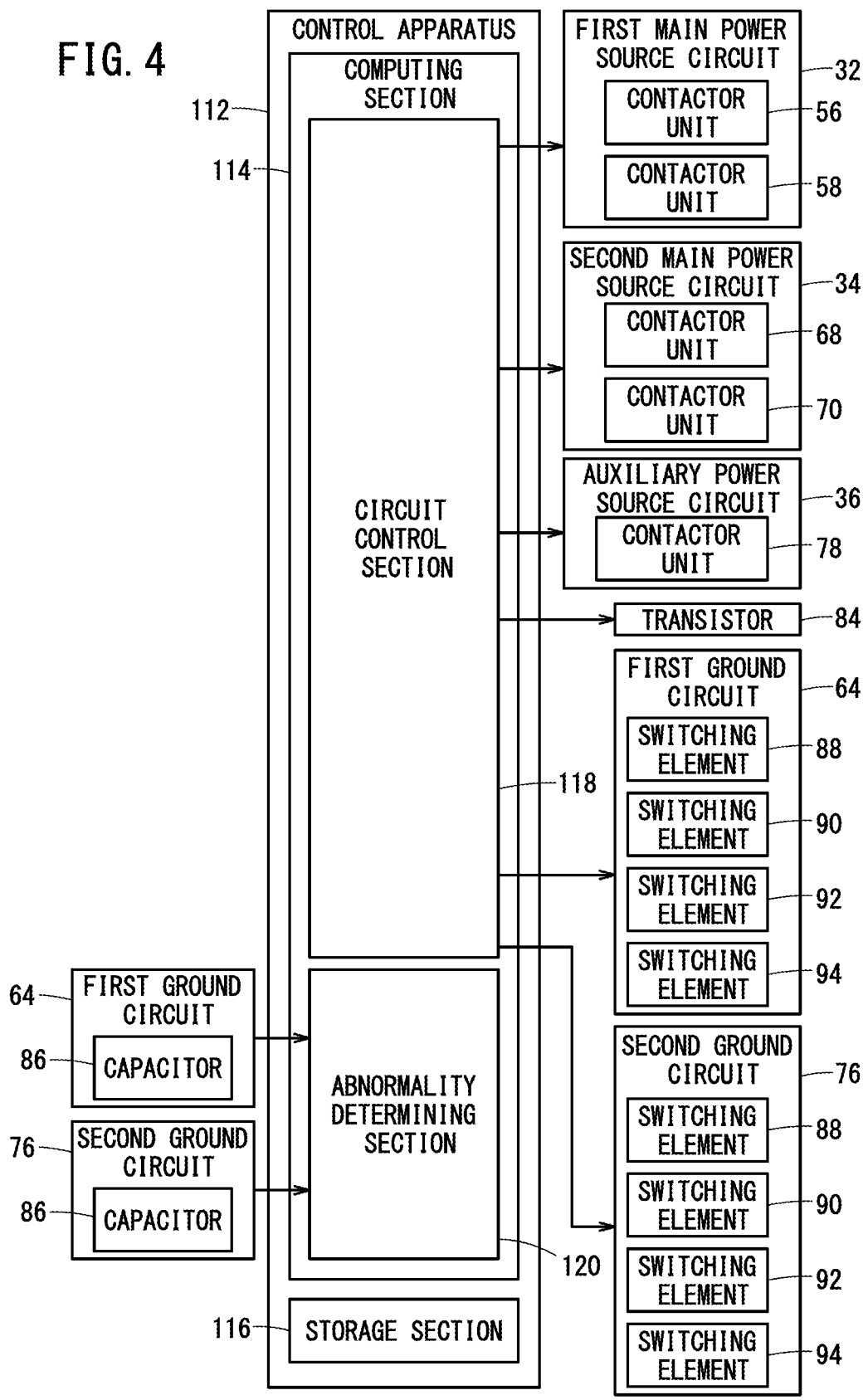
FIG. 4 is a block diagram showing a configuration of a control apparatus.

FIG. 4 is a block diagram showing the configuration of a control apparatus 112. The control apparatus 112 includes a computing section 114 and a storage section 116. The computing section 114 is a processor such as a CPU (Central Processing Unit) or a GPU (Graphics Processing Unit), for example. The computing section 114 includes a circuit control section 118 and an abnormality determining section 120. The circuit control section 118 and the abnormality determining section 120 are realized by the computing section 114 executing programs stored in the storage section 116. At least a portion of the circuit control section 118 and the abnormality determining section 120 may be realized by an integrated circuit such as an ASIC (Application Specific Integrated Circuit) or an FPGA (Field-Programmable Gate Array). At least a portion of the circuit control section 118 and the abnormality determining section 120 may be realized by an electronic circuit including a discrete device.

The storage section 116 is formed by a volatile memory (not shown in the drawings) and a nonvolatile memory (not shown in the drawings) that are computer-readable storage media. The volatile memory is a RAM (Random Access Memory) or the like, for example. The nonvolatile memory is a ROM (Read Only Memory), a flash memory, or the like, for example. Data and the like are stored in the volatile memory, for example. Programs, tables, maps, and the like are stored in the nonvolatile memory, for example. At least a portion of the storage section 116 may be provided in the processor, integrated circuit, or the like described above.

The circuit control section 118 controls each contactor unit 56 and each contactor unit 58 of the first main power source circuit 32, each contactor unit 68 and each contactor unit 70 of the second main power source circuit 34, the contactor unit 78 of each auxiliary power source circuit 36, and each transistor 84. The circuit control section 118 controls the switching element 88, the switching element 90, the switching element 92, and the switching element 94 of the first ground circuit 64, and the switching element 88, the switching element 90, the switching element 92, and the switching element 94 of the second ground circuit 76.

The abnormality determining section 120 determines whether there is an abnormality in each of the power transmission bus 54 and the power transmission bus 66, based on the voltage of the capacitor 86 of the first ground circuit 64 and the voltage of the capacitor 86 of the second ground circuit 76.

[Abnormality Determination for Second Power Source Circuit]

The abnormality determining section 120 determines whether there is an abnormality individually for each of the following four wires (1) to (4) among the wires of the second main power source circuit 34. These four wires are (1) the positive wire between the main power source apparatus 26 and the second ground circuit 76, (2) the negative wire between the main power source apparatus 26 and the second ground circuit 76, (3) the positive wire between the load module 30 and the second ground circuit 76, and (4) the negative wire between the load module 30 and the second ground circuit 76.

(Abnormality Determination for Positive Wire Between Main Power Source Apparatus and Second Ground Circuit)

Figure 5:
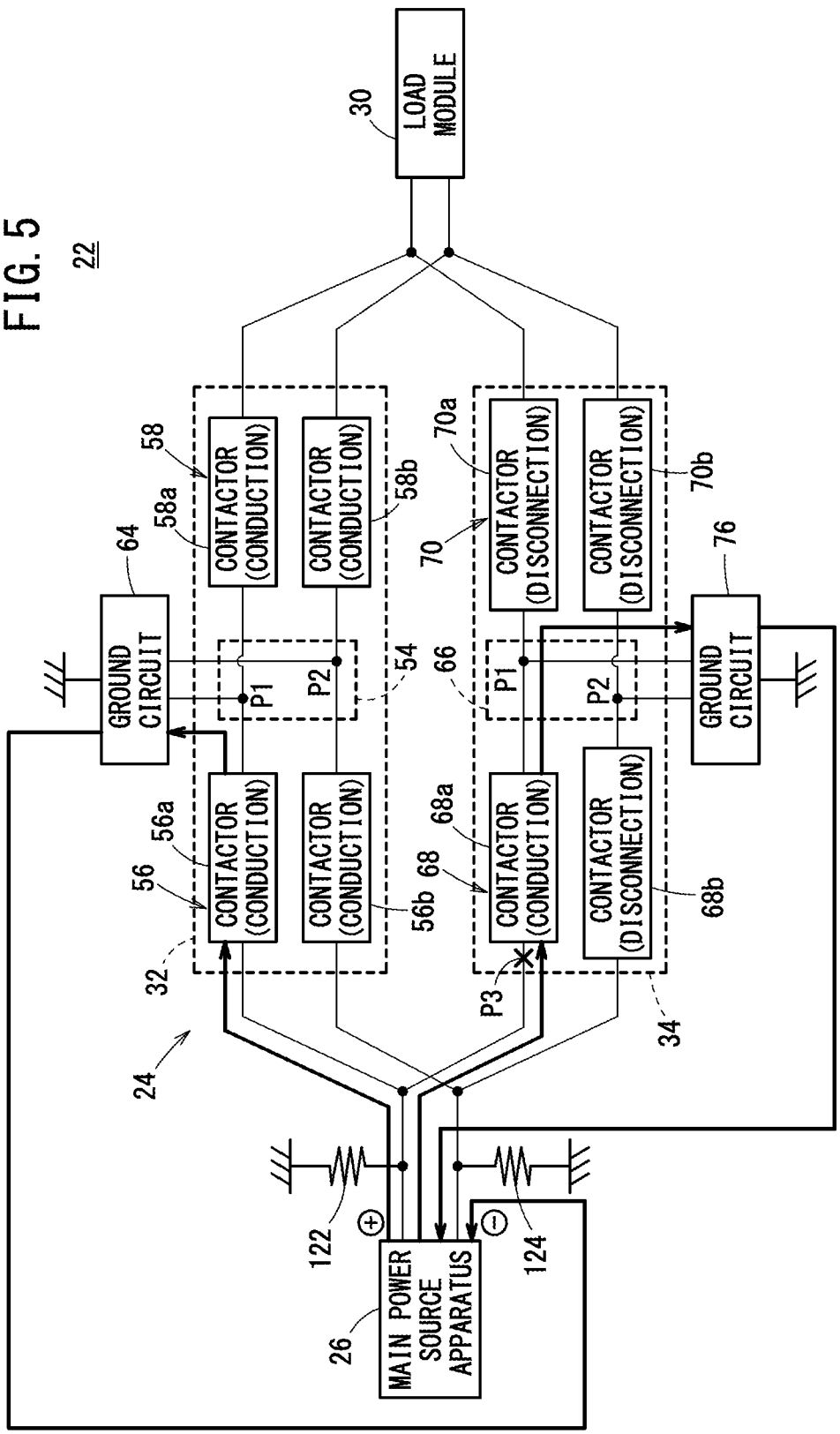
FIG. 5 is a schematic view of the power supply system.

FIG. 5 is a schematic view of the power supply system 22. FIG. 5 schematically shows the circuit configuration of the power supply circuit 24 between one main power source apparatus 26 and one load module 30. The following will describe an abnormality determination for the positive wire between the main power source apparatus 26 and the second ground circuit 76, using FIG. 5. The positive wire between the main power source apparatus 26 and the second ground circuit 76 is the wire (1) described above. Even in a case where there are two or more main power source apparatuses 26 or a case where there are two or more load modules 30, the abnormality determination is performed according to a method that is basically the same as the method described below.

The arrows shown in FIG. 5 indicate the flow of current through the first ground circuit 64 and the second ground circuit 76. A resistor 122 indicates an insulation resistance between the positive electrode of the main power source apparatus 26 and the fuselage 12. A resistor 124 indicates an insulation resistance between the negative electrode of the main power source apparatus 26 and the fuselage 12.

If power is being transmitted from the main power source apparatus 26 to the load module 30 by the first main power source circuit 32 and not being transmitted from the main power source apparatus 26 to the load module 30 by the second main power source circuit 34, the abnormality determining section 120 performs the abnormality determination for the second main power source circuit 34. When the abnormality determination is to be performed for the second main power source circuit 34, as shown in FIG. 5, the contactor 56a, the contactor 56b, the contactor 58a, and the contactor 58b in the first main power source circuit 32 are each controlled to be in the conductive state. Furthermore, only the contactor 68a in the second main power source circuit 34 is controlled to be in the conductive state. That is, the contactor 68b, the contactor 70a, and the contactor 70b are each controlled to be in the disconnection state.

Figure 6:
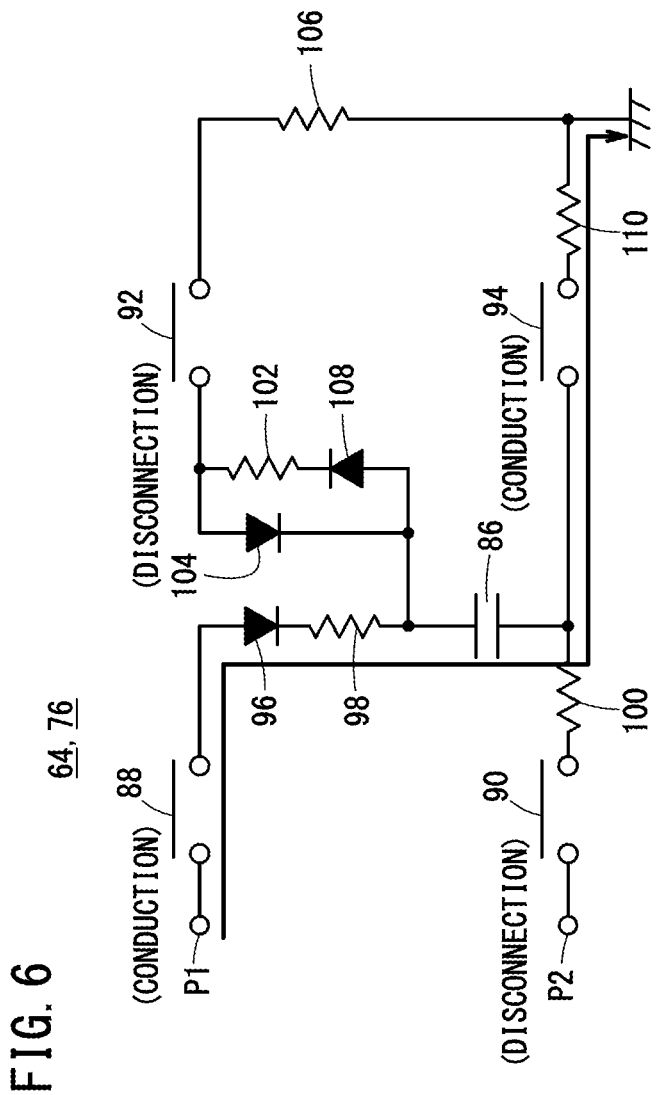
FIG. 6 is a circuit diagram of the first ground circuit and the second ground circuit.

FIG. 6 is a circuit diagram of the first ground circuit 64 and the second ground circuit 76. The arrow shown in FIG. 6 indicates the flow of current through the first ground circuit 64 or the second ground circuit 76.

When the abnormality determination is to be performed for the positive wire between the main power source apparatus 26 and the second ground circuit 76, as shown in FIG. 6, the switching element 88 and the switching element 94 of each of the first ground circuit 64 and the second ground circuit 76 are controlled to be in the conductive state. The switching element 90 and the switching element 92 of each of the first ground circuit 64 and the second ground circuit 76 are controlled to be in the disconnection state.

Due to this, the positive wire of the first main power source circuit 32 is connected to the reference potential, and the positive wire of the second main power source circuit 34 is connected to the reference potential. In this case, since the resistance value of the resistor 98 is relatively large, a large current does not flow through the first ground circuit 64 and the second ground circuit 76. The capacitor 86 of the first ground circuit 64 and the capacitor 86 of the second ground circuit 76 are charged with the power supplied respectively to the first ground circuit 64 and the second ground circuit 76. When charging of the capacitors 86 is completed, current does not flow through the first ground circuit 64 and the second ground circuit 76. Therefore, it is possible to suppress the amount of power supplied from the power transmission bus 54 to the first ground circuit 64 and the amount of power supplied from the power transmission bus 66 to the second ground circuit 76.

Figure 7A:
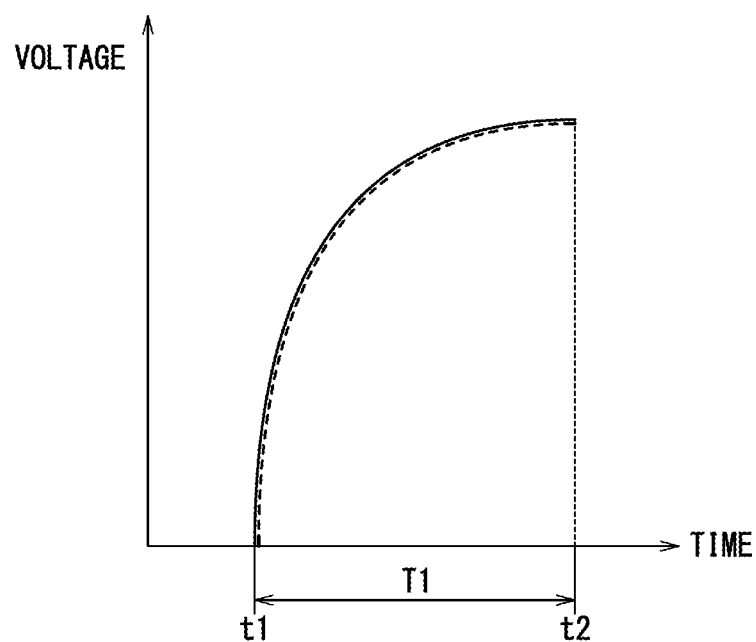
FIG. 7A is a graph showing change over time of voltage of capacitors.
Figure 7B:
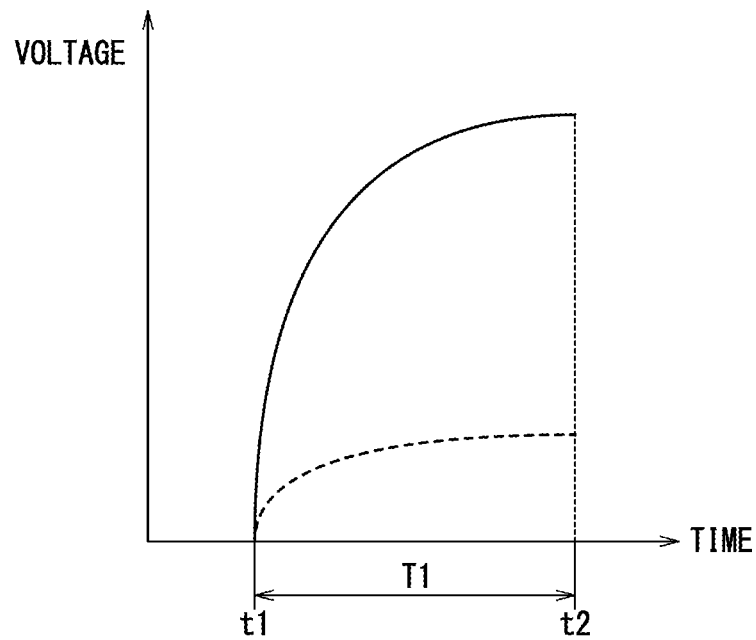
FIG. 7B is a graph showing change over time of the voltage of the capacitors.

FIGS. 7A and 7B are each a graph showing the change over time of the voltage of the capacitors 86. FIG. 7A shows the change over time of the voltage of the capacitors 86 when the second main power source circuit 34 is operating normally. FIG. 7B shows the change over time of the voltage of the capacitors 86 when there is an abnormality in the second main power source circuit 34. The solid lines indicate the change over time of the voltage of the capacitor 86 of the first ground circuit 64, and the dotted lines indicate the change over time of the voltage of the capacitor 86 of the second ground circuit 76.

As an example, if a disconnection has occurred at a point P3 of FIG. 5, the amount of power supplied to the second ground circuit 76 becomes less than the amount of power supplied to the first ground circuit 64. The amount of power supplied to the first ground circuit 64 is correlated with the voltage of the capacitor 86 of the first ground circuit 64. The amount of power supplied to the second ground circuit 76 is correlated with the voltage of the capacitor 86 of the second ground circuit 76.

The abnormality determining section 120 determines whether there is an abnormality in the second main power source circuit 34 based on the voltage of the capacitor 86 at a timing t2, which is a timing after a prescribed time T1 has elapsed from a timing t1 at which the charging of the capacitor 86 was started. If the difference between the voltage of the capacitor 86 of the first ground circuit 64 and the voltage of the capacitor 86 of the second ground circuit 76 is greater than or equal to a prescribed value, the abnormality determining section 120 determines that there is an abnormality in the positive wire between the main power source apparatus 26 and the second ground circuit 76. An abnormality in the positive wire between the main power source apparatus 26 and the second ground circuit 76 indicates that this wire has become disconnected or that the contactor 68a has become stuck in the OFF state.

When an abnormality determination is to be performed for the second main power source circuit 34, only the contactor 68a in the second main power source circuit 34 is controlled to be in the conductive state. Therefore, even if the insulation resistance between the positive wire and the negative wire drops in the power transmission bus 66 and a short occurs between the positive wire and the negative wire, a short-circuit current does not flow therethrough.

(Abnormality Determination for Negative Wire Between Main Power Source Apparatus and Second Ground Circuit)

FIG. 8 is a schematic view of the power supply system 22. FIG. 8 schematically shows the circuit configuration of the power supply circuit 24 between one main power source apparatus 26 and one load module 30. The following will describe an abnormality determination for the negative wire between the main power source apparatus 26 and the second ground circuit 76, using FIG. 8. The negative wire between the main power source apparatus 26 and the second ground circuit 76 is the wire (2) described above. Even in a case where there are two or more main power source apparatuses 26, or a case where there are two or more load modules 30, the abnormality determination is performed according to a method that is basically the same as the method described below.

The arrows shown in FIG. 8 indicate the flow of current through the first ground circuit 64 and the second ground circuit 76.

As shown in FIG. 8, the contactor 56a, the contactor 56b, the contactor 58a, and the contactor 58b in the first main power source circuit 32 are each controlled to be in the conductive state. Furthermore, only the contactor 68b in the second main power source circuit 34 is controlled to be in the conductive state. That is, the contactor 68a, the contactor 70a, and the contactor 70b are each controlled to be in the disconnection state.

Figure 9:
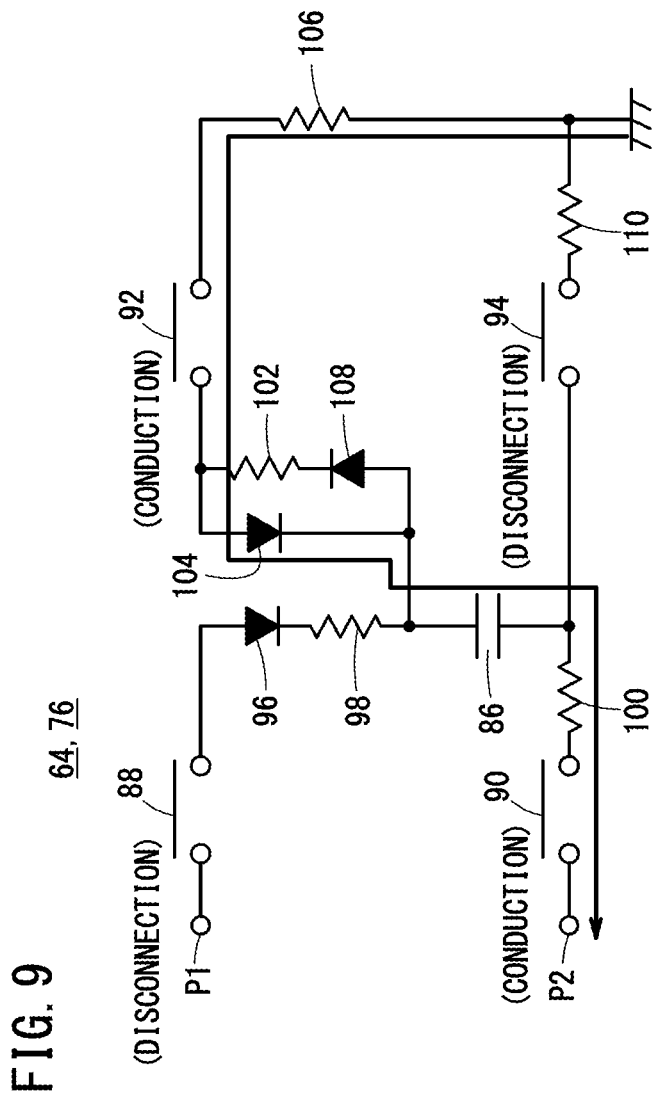
FIG. 9 is a circuit diagram of the first ground circuit and the second ground circuit.

FIG. 9 is a circuit diagram of the first ground circuit 64 and the second ground circuit 76. The arrow shown in FIG. 9 indicates the flow of current through the first ground circuit 64 or the second ground circuit 76.

When the abnormality determination is to be performed for the negative wire between the main power source apparatus 26 and the second ground circuit 76, as shown in FIG. 9, the switching element 90 and the switching element 92 of each of the first ground circuit 64 and the second ground circuit 76 are controlled to be in the conductive state. The switching element 88 and the switching element 94 of each of the first ground circuit 64 and the second ground circuit 76 are controlled to be in the disconnection state.

Due to this, the negative wire of the first main power source circuit 32 is connected to the reference potential, and the negative wire of the second main power source circuit 34 is connected to the reference potential. In this case, since the resistance value of the resistor 100 is relatively large, a large current does not flow through the first ground circuit 64 and the second ground circuit 76. The capacitor 86 of the first ground circuit 64 and the capacitor 86 of the second ground circuit 76 are charged with the power supplied respectively to the first ground circuit 64 and the second ground circuit 76. When charging of the capacitors 86 is completed, current does not flow through the first ground circuit 64 and the second ground circuit 76. Therefore, it is possible to suppress the amount of power supplied from the power transmission bus 54 to the first ground circuit 64 and the amount of power supplied from the power transmission bus 66 to the second ground circuit 76.

As an example, if a disconnection has occurred at a point P4 of FIG. 8, the amount of power supplied to the second ground circuit 76 becomes less than the amount of power supplied to the first ground circuit 64. The amount of power supplied to the first ground circuit 64 is correlated with the voltage of the capacitor 86 of the first ground circuit 64. The amount of power supplied to the second ground circuit 76 is correlated with the voltage of the capacitor 86 of the second ground circuit 76.

If the difference between the voltage of the capacitor 86 of the first ground circuit 64 and the voltage of the capacitor 86 of the second ground circuit 76 is greater than or equal to the prescribed value, the abnormality determining section 120 determines that there is an abnormality in the negative wire between the main power source apparatus 26 and the second ground circuit 76. An abnormality in the negative wire between the main power source apparatus 26 and the second ground circuit 76 indicates that this wire has become disconnected or that the contactor 68b has become stuck in the OFF state.

(Abnormality Determination for Positive Wire Between Load Module and Second Ground Circuit)

Figure 10:
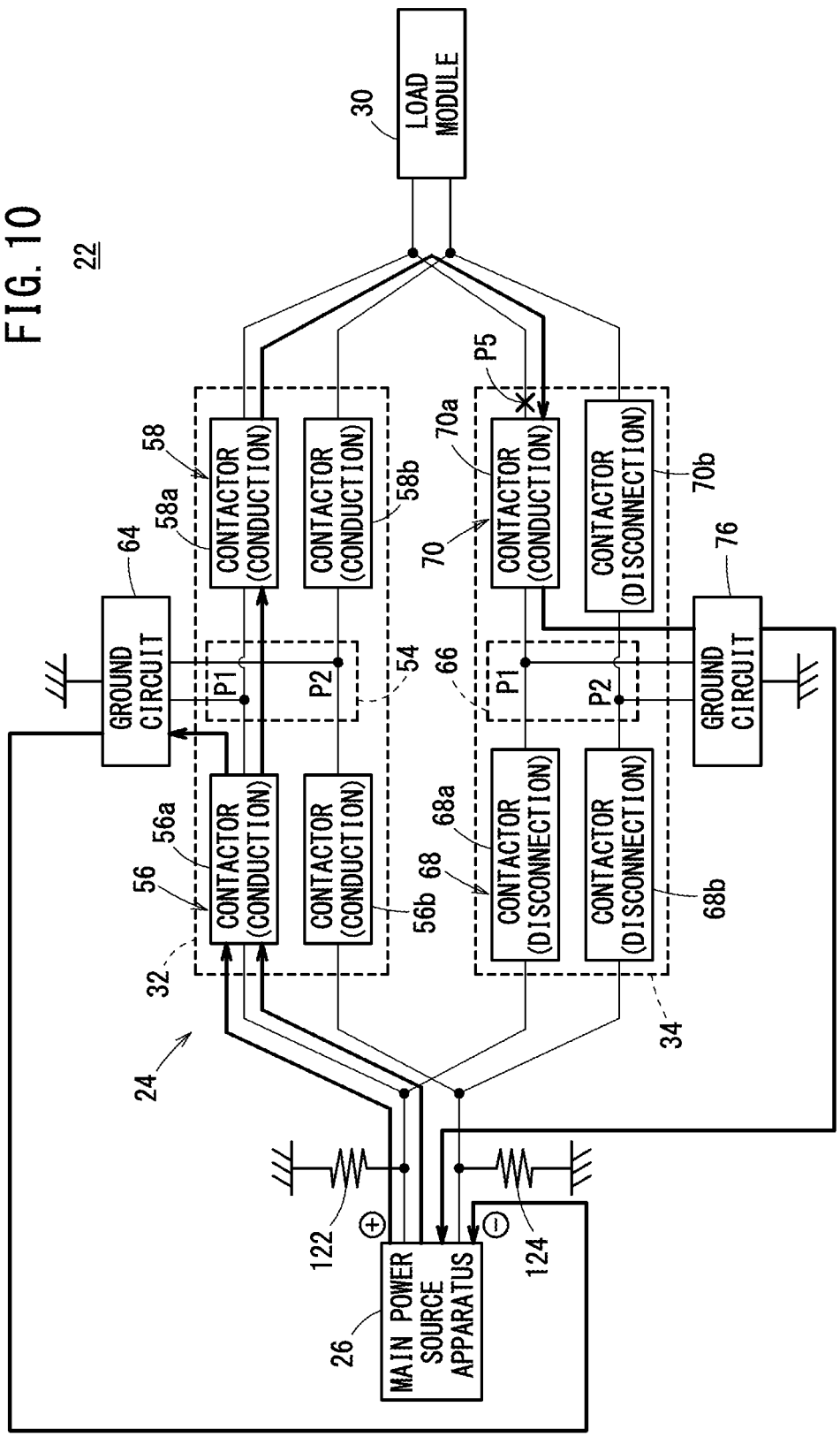
FIG. 10 is a schematic view of the power supply system.

FIG. 10 is a schematic view of the power supply system 22. FIG. 10 schematically shows the circuit configuration of the power supply circuit 24 between one main power source apparatus 26 and one load module 30. The following will describe an abnormality determination for the positive wire between the load module 30 and the second ground circuit 76, using FIG. 10. The positive wire between the load module 30 and the second ground circuit 76 is the wire (3) described above. Even in a case where there are two or more main power source apparatuses 26 or a case where there are two or more load modules 30, the abnormality determination is performed according to a method that is basically the same as the method described below.

The arrows shown in FIG. 10 indicate the flow of current through the first ground circuit 64 and the second ground circuit 76.

As shown in FIG. 10, the contactor 56a, the contactor 56b, the contactor 58a, and the contactor 58b in the first main power source circuit 32 are each controlled to be in the conductive state. Furthermore, only the contactor 70a in the second main power source circuit 34 is controlled to be in the conductive state. That is, the contactor 68a, the contactor 68b, and the contactor 70b are each controlled to be in the disconnection state.

When the abnormality determination is to be performed for the positive wire between the load module 30 and the second ground circuit 76, as shown in FIG. 6, the switching element 88 and the switching element 94 of each of the first ground circuit 64 and the second ground circuit 76 are controlled to be in the conductive state. The switching element 90 and the switching element 92 of each of the first ground circuit 64 and the second ground circuit 76 are controlled to be in the disconnection state.

Due to this, the positive wire of the first main power source circuit 32 is connected to the reference potential, and the positive wire of the second main power source circuit 34 is connected to the reference potential. In this case, since the resistance value of the resistor 98 is relatively large, a large current does not flow through the first ground circuit 64 and the second ground circuit 76. The capacitor 86 of the first ground circuit 64 and the capacitor 86 of the second ground circuit 76 are charged with the power supplied respectively to the first ground circuit 64 and the second ground circuit 76. When charging of the capacitors 86 is completed, current does not flow through the first ground circuit 64 and the second ground circuit 76. Therefore, it is possible to suppress the amount of power supplied from the power transmission bus 54 to the first ground circuit 64 and the amount of power supplied from the power transmission bus 66 to the second ground circuit 76.

As an example, if a disconnection has occurred at a point P5 of FIG. 10, the amount of power supplied to the second ground circuit 76 becomes less than the amount of power supplied to the first ground circuit 64. The amount of power supplied to the first ground circuit 64 is correlated with the voltage of the capacitor 86 of the first ground circuit 64. The amount of power supplied to the second ground circuit 76 is correlated with the voltage of the capacitor 86 of the second ground circuit 76.

If the difference between the voltage of the capacitor 86 of the first ground circuit 64 and the voltage of the capacitor 86 of the second ground circuit 76 is greater than or equal to the prescribed value, the abnormality determining section 120 determines that there is an abnormality in the positive wire between the load module 30 and the second ground circuit 76. An abnormality in the positive wire between the load module 30 and the second ground circuit 76 indicates that this wire has become disconnected or that the contactor 70a has become stuck in the OFF state.

(Abnormality Determination for Negative Wire Between Load Module and Second Ground Circuit)

Figure 11:
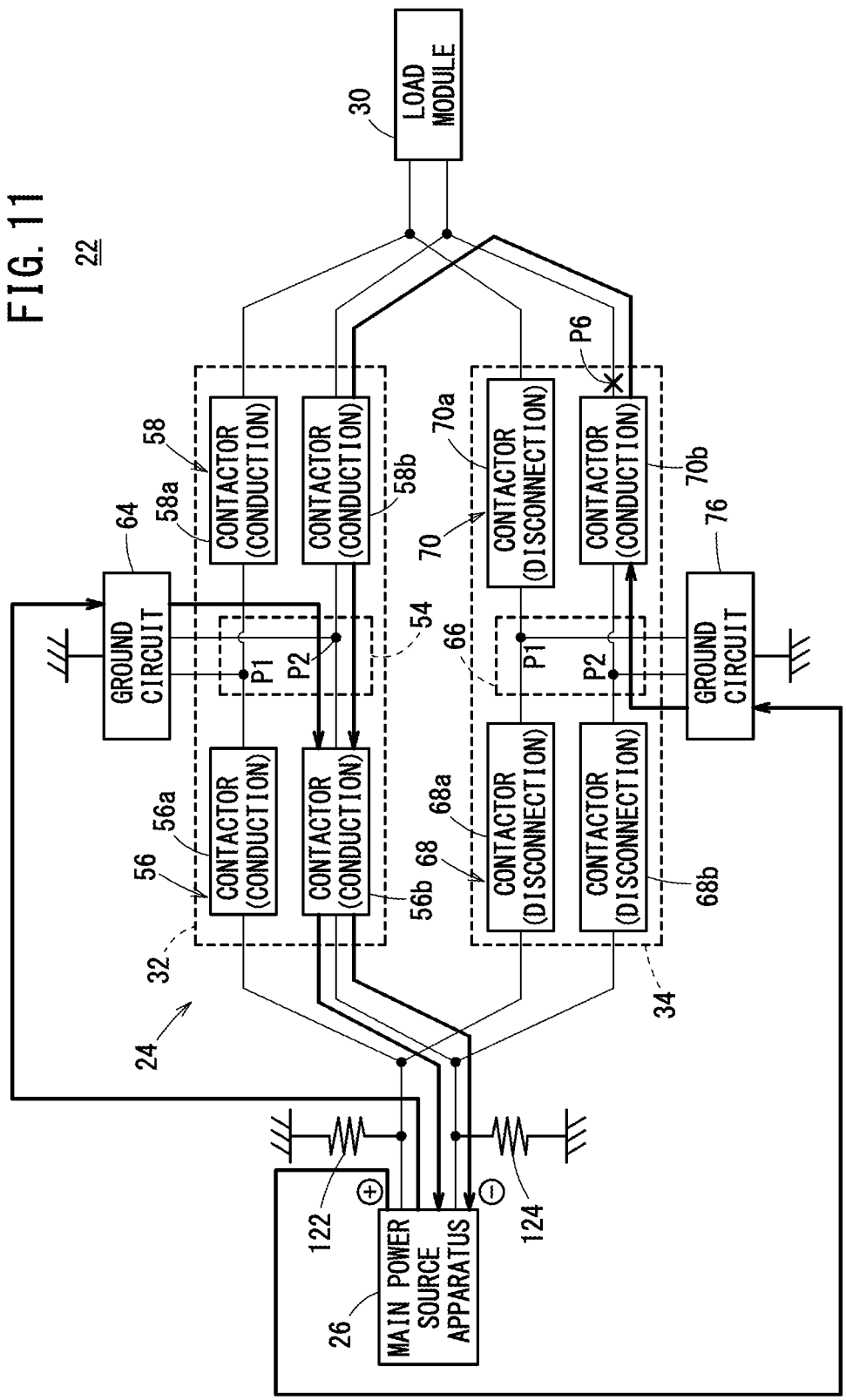
FIG. 11 is a schematic view of the power supply system.

FIG. 11 is a schematic view of the power supply system 22. FIG. 11 schematically shows the circuit configuration of the power supply circuit 24 between one main power source apparatus 26 and one load module 30. The following will describe an abnormality determination for the negative wire between the load module 30 and the second ground circuit 76, using FIG. 11. The negative wire between the load module 30 and the second ground circuit 76 is the wire (4) described above. Even in a case where there are two or more main power source apparatuses 26 or a case where there are two or more load modules 30, the abnormality determination is performed according to a method that is basically the same as the method described below.

The arrows shown in FIG. 11 indicate the flow of current through the first ground circuit 64 and the second ground circuit 76.

As shown in FIG. 11, the contactor 56a, the contactor 56b, the contactor 58a, and the contactor 58b in the first main power source circuit 32 are each controlled to be in the conductive state. Furthermore, only the contactor 70b in the second main power source circuit 34 is controlled to be in the conductive state. That is, the contactor 68a, the contactor 68b, and the contactor 70a are each controlled to be in the disconnection state.

When the abnormality determination is to be performed for the negative wire between the load module 30 and the second ground circuit 76, as shown in FIG. 9, the switching element 90 and the switching element 92 of each of the first ground circuit 64 and the second ground circuit 76 are controlled to be in the conductive state. The switching element 88 and the switching element 94 of each of the first ground circuit 64 and the second ground circuit 76 are controlled to be in the disconnection state.

Due to this, the negative wire of the first main power source circuit 32 is connected to the reference potential, and the negative wire of the second main power source circuit 34 is connected to the reference potential. In this case, since the resistance value of the resistor 100 is relatively large, a large current does not flow through the first ground circuit 64 and the second ground circuit 76. The capacitor 86 of the first ground circuit 64 and the capacitor 86 of the second ground circuit 76 are charged with the power supplied respectively to the first ground circuit 64 and the second ground circuit 76. When charging of the capacitors 86 is completed, current does not flow through the first ground circuit 64 and the second ground circuit 76. Therefore, it is possible to suppress the amount of power supplied from the power transmission bus 54 to the first ground circuit 64 and the amount of power supplied from the power transmission bus 66 to the second ground circuit 76.

As an example, if a disconnection has occurred at a point P6 of FIG. 11, the amount of power supplied to the second ground circuit 76 becomes less than the amount of power supplied to the first ground circuit 64. The amount of power supplied to the first ground circuit 64 is correlated with the voltage of the capacitor 86 of the first ground circuit 64. The amount of power supplied to the second ground circuit 76 is correlated with the voltage of the capacitor 86 of the second ground circuit 76.

If the difference between the voltage of the capacitor 86 of the first ground circuit 64 and the voltage of the capacitor 86 of the second ground circuit 76 is greater than or equal to the prescribed value, the abnormality determining section 120 determines that there is an abnormality in the negative wire between the load module 30 and the second ground circuit 76. An abnormality in the negative wire between the load module 30 and the second ground circuit 76 indicates that this wire has become disconnected or that the contactor 70b has become stuck in the OFF state.

(Discharge of Capacitors)

If the abnormality determination is performed individually for each of the four wires (1) to (4) described above, it is necessary to discharge the capacitors 86 after making the abnormality determination for each wire.

Figure 12:
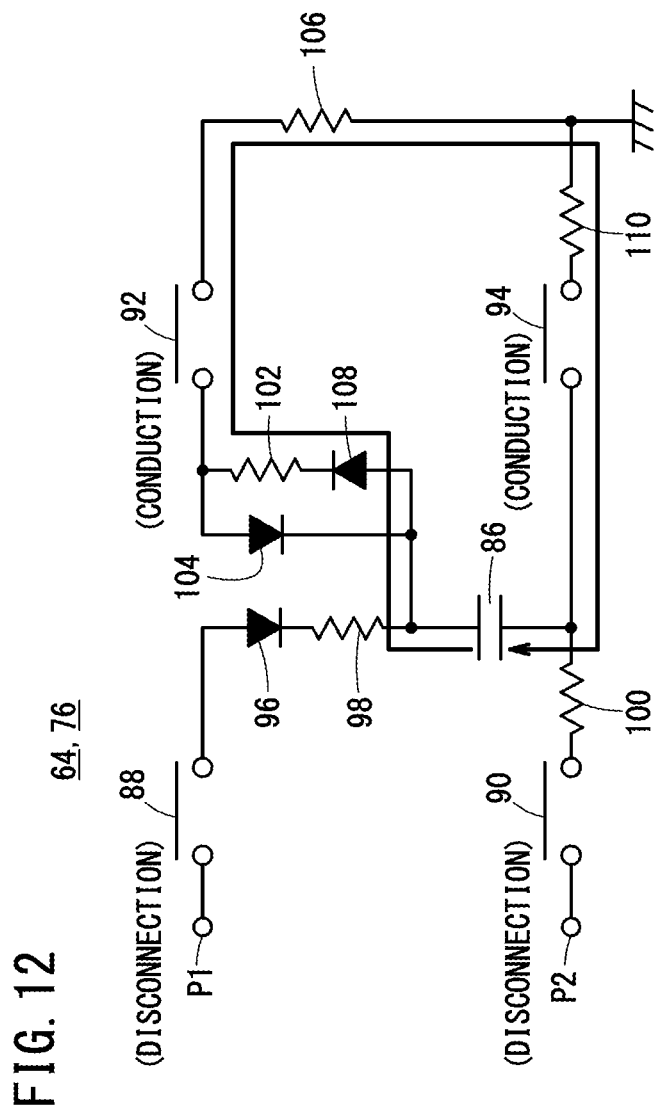
FIG. 12 is a circuit diagram of the first ground circuit and the second ground circuit.

FIG. 12 is a circuit diagram of the first ground circuit 64 and the second ground circuit 76. The arrow shown in FIG. 12 indicates the flow of current through the first ground circuit 64 or the second ground circuit 76.

As shown in FIG. 12, when discharging the capacitor 86, the switching element 92 and the switching element 94 in each of the first ground circuit 64 and the second ground circuit 76 are controlled to be in the conductive state. The switching element 88 and the switching element 90 in each of the first ground circuit 64 and the second ground circuit 76 are controlled to be in the disconnection state. Due to this, the power charged in the capacitor 86 is consumed by the resistor 102, the resistor 106, and the resistor 110, and the capacitor 86 can be discharged.

Figure 13:
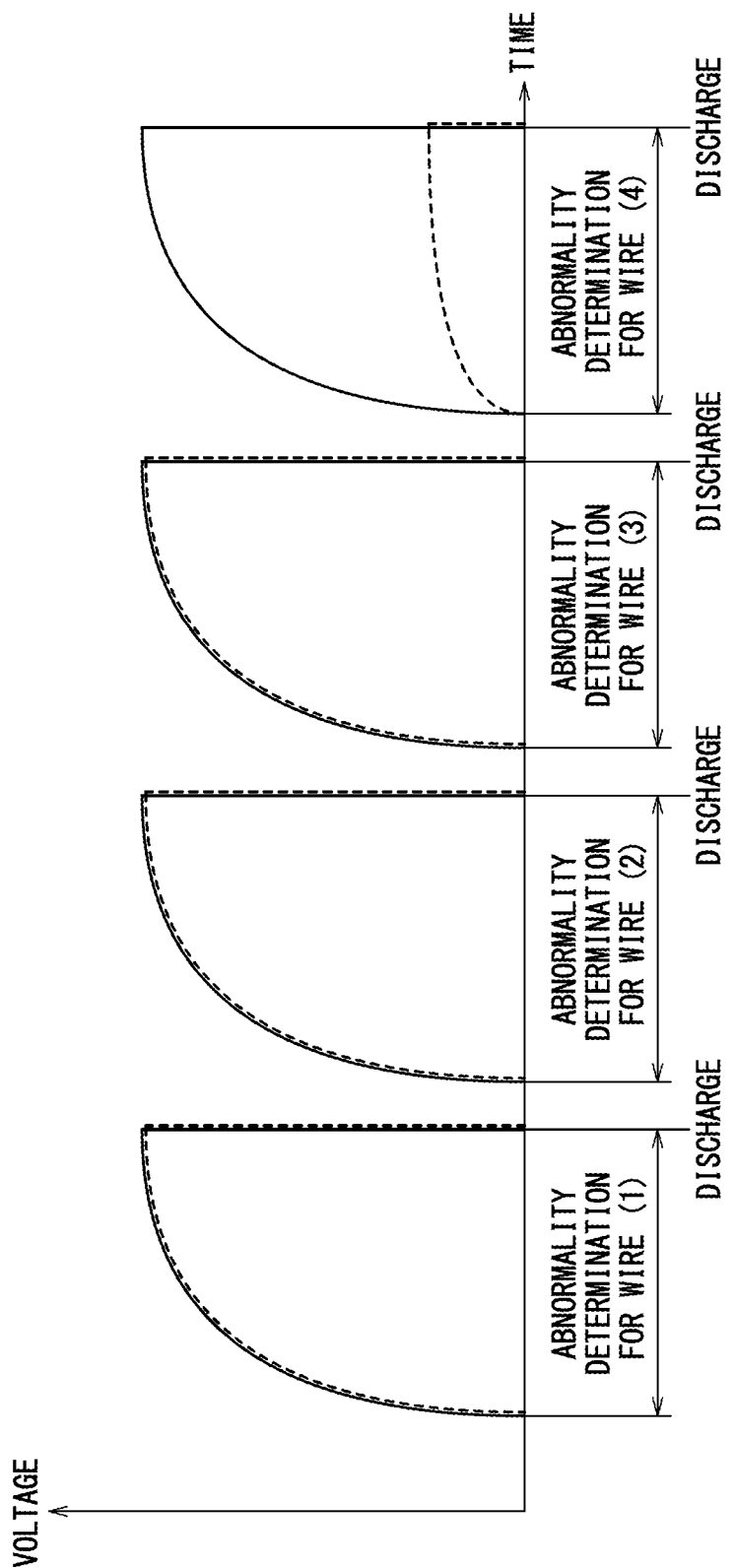
FIG. 13 is a graph showing change over time of the voltage of the capacitors.

FIG. 13 is a graph showing the change over time of the voltage of the capacitors 86. The solid lines indicate the change over time of the voltage of the capacitor 86 of the first ground circuit 64, and the dotted lines indicate the change over time of the voltage of the capacitor 86 of the second ground circuit 76. The abnormality determination is performed in order on the wires (1) to (4) described above. As an example, when the voltage of the capacitors 86 changes as shown in FIG. 13, the abnormality determining section 120 determines that there is an abnormality of the negative wire between the load module 30 and the second ground circuit 76.

Effect of the Invention

With the power supply system 22 of the present embodiment, usually, to transmit power from the main power source apparatus 26 to the load module 30, the first main power source circuit 32 is used and the second main power source circuit 34 is not used. When an abnormality has occurred in the first main power source circuit 32, the second main power source circuit 34 is used to transmit power from the main power source apparatus 26 to the load module 30. Therefore, it is necessary to perform an abnormality determination for the second main power source circuit 34, even when the second main power source circuit 34 is not being used, so that it is possible to switch from the first main power source circuit 32 to the second main power source circuit 34 at any time. In order to perform the abnormality determination for the second main power source circuit 34, the second main power source circuit 34 must be energized.

In order to energize the second main power source circuit 34, it is conceivable to connect the second main power source circuit 34 to the main power source apparatus 26. If a short has occurred between the positive wire and the negative wire of the power transmission bus 66 of the second main power source circuit 34, there is a concern that when the second main power source circuit 34 is energized, a short-circuit current will flow from the main power source apparatus 26 to the location of the short, and power cannot be transmitted from the main power source apparatus 26 to the load module 30.

Therefore, with the power supply system 22 of the present embodiment, the circuit control section 118 disconnects both the positive wire and negative wire between the load module 30 and the second ground circuit 76. Furthermore, the circuit control section 118 connects one of the positive wire or the negative wire between the main power source apparatus 26 and the second ground circuit 76. Yet further, the circuit control section 118 causes the second ground circuit 76 to connect one of the positive wire or the negative wire of the second main power source circuit 34 to the ground potential. In this state, the abnormality determining section 120 determines whether the second main power source circuit 34 has an abnormality, based on the amount of power supplied to the second ground circuit 76. Due to this, even when the second main power source circuit 34 is energized in a state where a short has occurred between the positive wire and the negative wire of the power transmission bus 66 of the second main power source circuit 34, it is possible to prevent a short-circuit current from flowing from the main power source apparatus 26 to the location of the short. Therefore, it is possible to maintain the transmission of power from the main power source apparatus 26 to the load module 30.

Further, with the power supply system 22 of the present embodiment, the circuit control section 118 disconnects both the positive wire and the negative wire between the main power source apparatus 26 and the second ground circuit 76. Furthermore, the circuit control section 118 connects one of the positive wire or the negative wire between the load module 30 and the second ground circuit 76. Yet further, the circuit control section 118 determines whether there is an abnormality in the second main power source circuit 34, based on the amount of power supplied to the second ground circuit 76 in a state where one of the positive wire or the negative wire of the second main power source circuit 34 is connected to the reference potential by the second ground circuit 76. Due to this, even when the second main power source circuit 34 is energized in a state where a short has occurred between the positive wire and the negative wire of the power transmission bus 66 of the second main power source circuit 34, it is possible to prevent a short-circuit current from flowing from the main power source apparatus 26 to the location of the short. Therefore, the transmission of power from the main power source apparatus 26 to the load module 30 can be maintained.

While the aircraft 10 is in flight, the amount of power output from the main power source apparatus 26 changes. The amount of power supplied to the second ground circuit 76 changes according to the power output from the main power source apparatus 26. Therefore, there is a concern that when the abnormality determining section 120 determines whether there is an abnormality in the second main power source circuit 34 based on the amount of power supplied to the second ground circuit 76, the determination will have low accuracy.

With the power supply system 22 of the present embodiment, the abnormality determining section 120 determines whether there is an abnormality in the second main power source circuit 34 based on the voltage of the capacitor 86 of the first ground circuit 64 and the voltage of the capacitor 86 of the second ground circuit 76.

The amount of power supplied to the first ground circuit 64 also changes according to the power output from the main power source apparatus 26. With the power supply system 22 of the present embodiment, the determination concerning whether there is an abnormality in the second main power source circuit 34 can be made based on the amount of power flowing through the first ground circuit 64 and the amount of power flowing through the second ground circuit 76. Therefore, the accuracy of the abnormality determination for the second main power source circuit 34 can be improved.

With the power supply system 22 of the present embodiment, the first ground circuit 64 includes the resistor 98 or the resistor 100 between the first main power source circuit 32 and the reference potential. Furthermore, the second ground circuit 76 includes the resistor 98 or the resistor 100 between the second main power source circuit 34 and the reference potential. Due to this, it is possible to restrict a large current from flowing through the first ground circuit 64 and the second ground circuit 76.

The present invention is not limited to the above disclosure, and various modifications are possible without departing from the essence and gist of the present invention.

In the power supply system 22 of the first embodiment, the main power source apparatus 26 includes the gas turbine 38, the power generator 40, and the PCU 42. Instead, the main power source apparatus 26 may include a battery or a capacitor.

The main power source apparatus 26 may include, in addition to the gas turbine 38, the power generator 40, and the PCU 42, elements such as a sensor, a fuse, a relay, a breaker, a diode, a transistor, a resistor, a coil, and a capacitor.

In the power supply system 22 of the first embodiment, the auxiliary power source apparatus 28 includes the battery 52. Instead, the auxiliary power source apparatus 28 may include a gas turbine, a power generator, and a PCU. Alternatively, the auxiliary power source apparatus 28 may include a capacitor.

The auxiliary power source apparatus 28 may include, in addition to the battery 52, elements such as a sensor, a fuse, a relay, a breaker, a diode, a transistor, a resistor, a coil, and a capacitor.

The load module 30 may include, in addition to the converter 46, the electric motor 48, and the inverter 50, elements such as a sensor, a fuse, a relay, a breaker, a diode, a transistor, a resistor, a coil, and a capacitor.

The first main power source circuit 32 may include, in addition to the power transmission bus 54, the contactor unit 56, the contactor unit 58, the current sensor 60, and the current sensor 62, elements such as a sensor, a fuse, a relay, a breaker, a diode, a transistor, a resistor, a coil, and a capacitor.

The second main power source circuit 34 may include, in addition to the power transmission bus 66, the contactor unit 68, the contactor unit 70, the current sensor 72, and the current sensor 74, elements such as a sensor, a fuse, a relay, a breaker, a diode, a transistor, a resistor, a coil, and a capacitor.

The auxiliary power source circuit 36 may include, in addition to the contactor unit 78 and the current sensor 80, elements such as a sensor, a fuse, a relay, a breaker, a diode, a transistor, a resistor, a coil, and a capacitor.

Invention Obtainable from the Embodiment

The invention that can be understood from the above embodiment will be described below.

The power supply system (22) includes: the first main power source circuit (32) that transmits DC power from at least one main power source apparatus (26) to at least one load apparatus (30); the second main power source circuit (34) that is provided in parallel with the first main power source circuit, and transmits DC power from the at least one main power source apparatus to the at least one load apparatus; the ground circuit (76) that is connected to the second main power source circuit, and connects the second main power source circuit to the reference potential; and one or more processors that execute computer-executable instructions stored in a memory. The one or more processors execute the computer-executable instructions to cause the power supply system to, in a case where power is being transmitted from the main power source apparatus to the load apparatus by the first main power source circuit and power is not being transmitted from the main power source apparatus to the load apparatus by the second main power source circuit: disconnect both the positive wire and the negative wire between the load apparatus and the ground circuit, connect one of the positive wire or the negative wire between the main power source apparatus and the ground circuit, and determine whether there is an abnormality in the second main power source circuit based on the amount of power supplied to the ground circuit in a state where one of the positive wire or the negative wire of the second main power source circuit is connected to the reference potential by the ground circuit; or disconnect both the positive wire and the negative wire between the main power source apparatus and the ground circuit, connect one of the positive wire or the negative wire between the load apparatus and the ground circuit, and determine whether there is an abnormality in the second main power source circuit based on the amount of power supplied to the ground circuit in the state where one of the positive wire or the negative wire of the second main power source circuit is connected to the reference potential by the ground circuit. Due to this, even when the second main power source circuit is energized in a state where a short has occurred in the second main power source circuit, the transmission of power from the main power source apparatus to the load apparatus can be maintained.

In the power supply system described above, the ground circuit may include the first ground circuit (64) that connects the first main power source circuit to the reference potential, and the second ground circuit (76) that connects the second main power source circuit to the reference potential; the first ground circuit may include the capacitor (86) between the first main power source circuit and the reference potential; the second ground circuit may include the capacitor between the second main power source circuit and the reference potential; and the one or more processors may cause the power supply system to connect one of the positive wire or the negative wire of the first main power source circuit to the reference potential with the first ground circuit, connect one of the positive wire or the negative wire of the second main power source circuit to the reference potential with the second ground circuit, and determine whether there is an abnormality in the second power source circuit based on the voltage of the capacitor of the first ground circuit and the voltage of the capacitor of the second ground circuit. Due to this, the accuracy of the abnormality detection for the second main power source circuit can be improved.

In the power supply system described above, the first ground circuit may include the resistor (98) between the first main power source circuit and the reference potential; and the second ground circuit may include the resistor (100) between the second main power source circuit and the reference potential. Due to this, it is possible to restrict a large current from flowing through the first ground circuit and the second ground circuit.

The invention claimed is:

1. A power supply system comprising:
   a first main power source circuit configured to transmit direct current power from at least one main power source apparatus to at least one load apparatus;
   a second main power source circuit provided in parallel with the first main power source circuit, and configured to transmit direct current power from the at least one main power source apparatus to the at least one load apparatus;
   a ground circuit connected to the second main power source circuit, and configured to connect the second main power source circuit to a reference potential; and
   one or more processors that execute computer-executable instructions stored in a memory, wherein
   the one or more processors execute the computer-executable instructions to cause the power supply system to, in a case where power is being transmitted from the main power source apparatus to the load apparatus by the first main power source circuit and power is not being transmitted from the main power source apparatus to the load apparatus by the second main power source circuit:
   disconnect both a positive wire and a negative wire between the load apparatus and the ground circuit, connect one of a positive wire or a negative wire between the main power source apparatus and the ground circuit, and determine whether there is an abnormality in the second main power source circuit based on an amount of power supplied to the ground circuit in a state where one of a positive wire or a negative wire of the second main power source circuit is connected to the reference potential by the ground circuit; or
   disconnect both the positive wire and the negative wire between the main power source apparatus and the ground circuit, connect one of the positive wire or the negative wire between the load apparatus and the ground circuit, and determine whether there is an abnormality in the second main power source circuit based on the amount of power supplied to the ground circuit in the state where one of the positive wire or the negative wire of the second main power source circuit is connected to the reference potential by the ground circuit.

2. The power supply system according to claim 1, wherein
   the ground circuit includes a first ground circuit configured to connect the first main power source circuit to the reference potential, and a second ground circuit configured to connect the second main power source circuit to the reference potential,
   the first ground circuit includes a capacitor between the first main power source circuit and the reference potential,
   the second ground circuit includes a capacitor between the second main power source circuit and the reference potential, and the one or more processors cause the power supply system to connect one of a positive wire or a negative wire of the first main power source circuit to the reference potential with the first ground circuit, connect one of the positive wire or the negative wire of the second main power source circuit to the reference potential with the second ground circuit, and determine whether there is an abnormality in the second power source circuit based on voltage of the capacitor of the first ground circuit and voltage of the capacitor of the second ground circuit.

3. The power supply system according to claim 2, wherein
the first ground circuit includes a resistor between the first main power source circuit and the reference potential, and
the second ground circuit includes a resistor between the second main power source circuit and the reference potential.

\* \* \* \* \*